United States Patent
Manabe

(10) Patent No.: US 8,182,953 B2
(45) Date of Patent: May 22, 2012

(54) FUEL CELL SYSTEM

(75) Inventor: Kota Manabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 546 days.

(21) Appl. No.: 12/522,427

(22) PCT Filed: Jan. 30, 2008

(86) PCT No.: PCT/JP2008/051886
§ 371 (c)(1),
(2), (4) Date: Jul. 8, 2009

(87) PCT Pub. No.: WO2008/093874
PCT Pub. Date: Aug. 7, 2008

(65) Prior Publication Data
US 2010/0086815 A1    Apr. 8, 2010

(30) Foreign Application Priority Data
Jan. 30, 2007   (JP) ................................. 2007-019061

(51) Int. Cl.
H01M 8/04    (2006.01)
H01M 8/00    (2006.01)

(52) U.S. Cl. ......................... 429/429; 429/428; 429/400

(58) Field of Classification Search .................. 429/429, 429/400, 428
See application file for complete search history.

(56) References Cited

U.S. PATENT DOCUMENTS
2004/0219409 A1    11/2004 Isogai

FOREIGN PATENT DOCUMENTS

| JP | 5-251101 A | 9/1993 |
|----|-----------|--------|
| JP | 2003-504807 A | 2/2003 |
| JP | 2003-115305 A | 4/2003 |
| JP | 2004-311218 A | 11/2004 |
| JP | 2004-327102 A | 11/2004 |
| JP | 2005-071626 A | 3/2005 |
| JP | 2005-100705 A | 4/2005 |
| JP | 2005-129449 A | 5/2005 |
| JP | 2005-197030 A | 7/2005 |
| JP | 2005-268179 A | 9/2005 |
| JP | 2005-276784 A | 10/2005 |
| JP | 2006-19192 A | 1/2006 |
| JP | 2006-100093 A | 4/2006 |
| JP | 2006-140044 A | 6/2006 |

Primary Examiner — Helen O Conley
(74) Attorney, Agent, or Firm — Kenyon & Kenyon LLP

(57) ABSTRACT

A fuel cell system capable of reducing time spent before actual execution of low-temperature countermeasure processing is provided. At the time of activation, a control unit for the fuel cell system refers to, for example, a detected FC temperature and judges whether or not the low-temperature countermeasure processing is necessary for the activation. If the control unit determines that the low-temperature countermeasure processing is necessary, it controls an output voltage of the fuel cell to be a target voltage for the low-temperature countermeasure processing, without having the fuel cell enter an OCV state, and then executes the low-temperature countermeasure processing.

3 Claims, 4 Drawing Sheets

FUEL CELL SYSTEM

This is a 371 national phase application of PCT/JP2008/051886 filed 30 Jan. 2008, which claims priority to Japanese Patent Application No. 2007-019061 filed 30 Jan. 2007, the contents of which are incorporated herein by reference.

TECHNICAL FIELD

The present invention relates to a fuel cell system.

BACKGROUND ART

When external temperatures are low, a fuel cell system has a problem in that damage that may be possibly caused to pipes and valves when water generated inside the fuel cell system becomes frozen after the fuel cell system is stopped; another problem that also exists is the problem of insufficient progress of an electrochemical reaction due to obstruction of gas supply when activating a fuel cell the next time after frozen water has blocked a gas passage.

In light of the problems described above, processing for, making at least either one of anode gas (such as a fuel gas) and cathode gas (such as oxidant gas) supplied to the respective electrodes of a fuel cell enter a deficient state at the time of activation of the system, increasing overvoltage in part of the electrodes, and thereby increasing the temperature of the fuel cell (hereinafter referred to as "low-temperature countermeasure processing") has been suggested (for example, see Patent Document 1).
[Patent Document 1] Japanese Patent Application Laid-Open (Kokai) Publication No. 2003-504807

DISCLOSURE OF THE INVENTION

In the conventional technique, the need for the low-temperature countermeasure processing is judged after having the fuel cell enter an OCV state (in other words, generating an OCV [Open Circuit Voltage]) once at the time of activation of the system and then checking (diagnosing) whether there is abnormality in the system or not. Therefore, it is necessary to make the fuel cell enter the OCV state when activating the system, and there is a problem of the long time spent before actually executing the low-temperature countermeasure processing.

The present invention was devised in light of the circumstances described above, and it is an object of the invention to provide a fuel cell system capable of reducing time spent before actual execution of the low-temperature countermeasure processing.

In order to solve the problem described above, a fuel cell system according to the present invention is a fuel cell system capable of executing low-temperature countermeasure processing, characterized in that the fuel cell system includes judgment means for judging the need for the low-temperature countermeasure processing before occurrence of an open circuit voltage in a fuel cell when activating the fuel cell system.

As described above, whether the low-temperature countermeasure processing is necessary or not is judged before the fuel cell enters the OCV state (in other words, before the open circuit voltage is generated in the fuel cell) when activating the system. Since the above-described configuration is employed, if it is determined that the low-temperature countermeasure processing is necessary, the fuel cell can be shifted to a target operating point for a low-temperature countermeasure without having the fuel cell enter the OCV state. As a result, it is possible to reduce time spent before execution of the low-temperature countermeasure processing as compared to the conventional technique according to which a fuel cell is made to enter the OCV state once, and then the low-temperature countermeasure processing is performed.

In the above-described configuration, the fuel cell system should preferably further include control means for generating a target voltage for the low-temperature countermeasure processing without generating an open circuit voltage in the fuel cell if the judgment means determines that the low-temperature countermeasure processing is necessary.

Also, it is preferable in the above-described configuration that the fuel cell system further includes: diagnosis means for diagnosing the condition of a component relating to the fuel cell at the time of termination of the system; and storage means for storing a diagnosis result; wherein the judgment means judges the need for the low-temperature countermeasure processing based on the diagnosis result at the time of termination of the system, which is stored in the storage means.

Furthermore, it is preferable in the above-described configuration that the fuel cell system further includes a temperature sensor for detecting a temperature relating to the fuel cell, wherein the judgment means judges the need for the low-temperature countermeasure processing based on the diagnosis result at the time of termination of the system, which is stored in the storage means, and the temperature relating to the fuel cell, which is detected by the temperature sensor.

Furthermore, it is preferable in the above-described configuration that the component relating to the fuel cell is a cell voltage sensor for detecting a cell voltage of the fuel cell.

As described above, the present invention makes it possible to reduce time spent before actual execution of the low-temperature countermeasure processing.

BEST MODE FOR CARRYING OUT THE INVENTION

Figure 1:
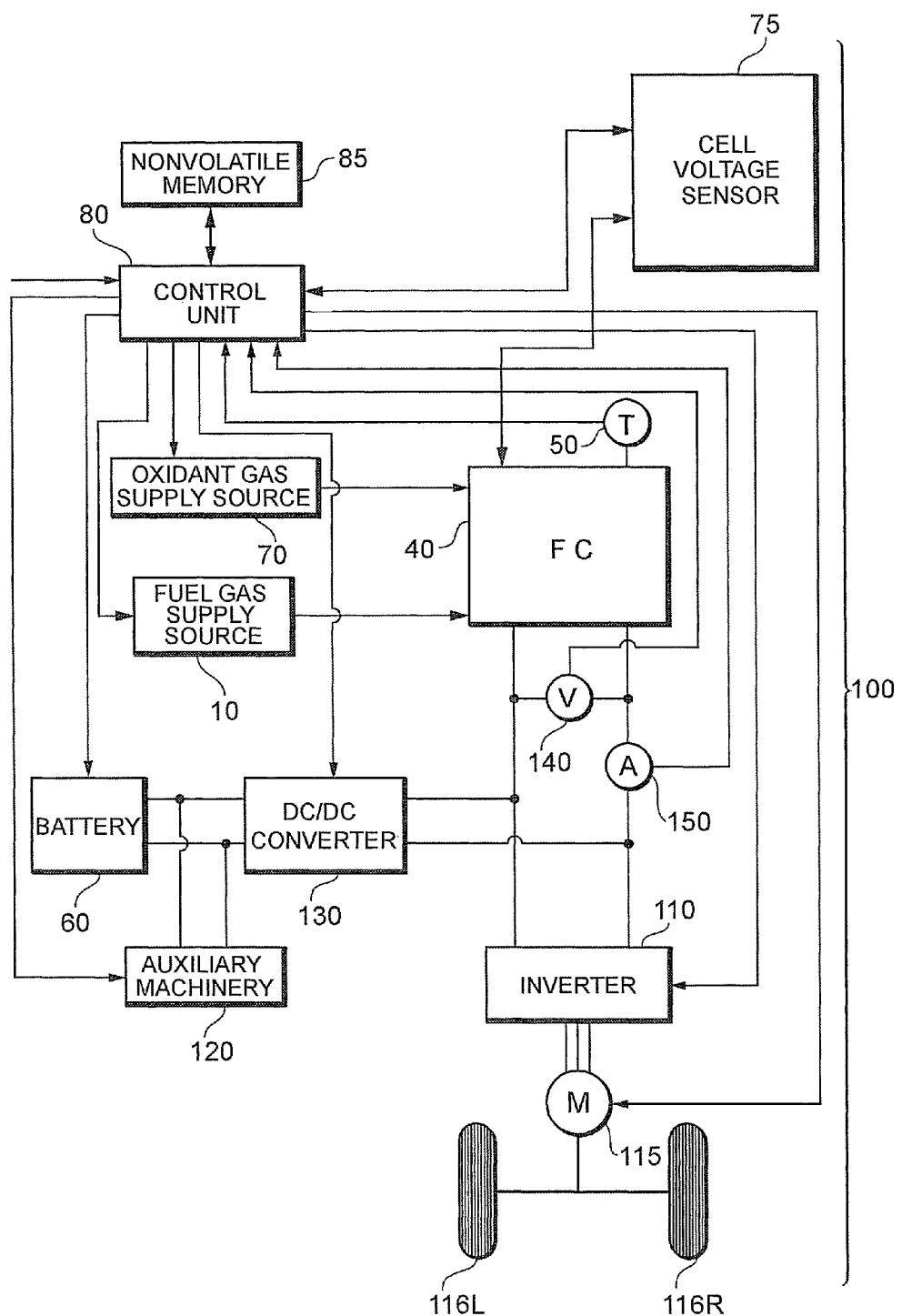
FIG. 1 shows the configuration of a fuel cell system according to an embodiment of the present invention.

An embodiment of the present invention will be explained below with reference to the attached drawings.
A. This Embodiment
(1) Configuration of Embodiment FIG. 1 is a diagram showing the main constituent parts of a fuel cell system 100 according to this embodiment. In this embodiment, a fuel cell system mounted in a vehicle such as a fuel cell powered vehicle (FCHV: Fuel Cell Hybrid Vehicle), an electric vehicle, or a hybrid vehicle is assumed, but the fuel cell system 100 can be used not only for vehicles, but also for various kinds of mobile bodies (such as ships, airplanes, and robots) and stationary power sources.

A fuel cell 40 is a means for generating electric power from supplied reactant gas (fuel gas and oxidant gas), and various types of fuel cells such as solid polymer fuel cells, phosphoric-acid fuel cells, and molten carbonate fuel cells can be used. The fuel cell 40 has a stack configuration in which a plurality of fuel cells including MEAs are stacked in series. An output voltage (hereinafter referred to as the "FC voltage") and an output current (hereinafter referred to as the "FC current") of the fuel cell 40 are detected by a voltage sensor 140 and a current sensor 150, respectively. Fuel gas such as hydrogen gas is supplied from a fuel gas supply source 10 to a fuel electrode (anode) of the fuel cell 40, while oxidant gas such as air is supplied from an oxidant gas supply source 70 to an oxygen electrode (cathode).

The fuel gas supply source 10 is constituted from, for example, a hydrogen tank and various valves and controls the amount of fuel gas to be supplied to the fuel cell 40 by adjusting, for example, the valve opening and on/off time.

The oxidant gas supply source 70 is constituted from, for example, an air compressor, a motor for driving the air compressor, and an inverter, and adjusts the amount of oxidant gas to be supplied to the fuel cell 40 by adjusting, for example, the number of revolutions of the motor.

A battery 60 is a secondary battery capable of charge and discharge and is composed of, for example, a nickel hydrogen battery. As a matter of course, a condenser (for example, a capacitor) capable of charge and discharge other than the secondary battery may be used instead of the battery 60. This battery 60 is connected in parallel with the fuel cell 40 via a DC/DC converter 130.

An inverter 110 is, for example, a PWM inverter of a pulse duration modulation type; and the inverter 110 converts direct-current power output from the fuel cell 40 or the battery 60 to three-phase alternating current power in accordance with a control instruction given from the control unit 80 and then supplies the three-phase alternating current power to a traction motor 115. The traction motor 115 is a motor for driving wheels 116L, 116R (i.e., a power source for mobile bodies), and the number of revolutions of the motor is controlled by the inverter 110. The traction motor 115 and the inverter 110 are connected to the fuel cell 40 side.

The DC/DC converter 130 is a full-bridge converter constituted from, for example, four power transistors and a dedicated drive circuit (all of which are not shown in the drawing). The DC/DC converter 130 has a function increasing or decreasing a DC voltage input from the battery 60 and outputting the resultant DC voltage to the fuel cell 40 side and a function increasing or decreasing a DC voltage input from, for example, the fuel cell 40 and outputting the resultant DC voltage to the battery 60 side. Furthermore, the battery 60 is charged or discharged by the functions of the DC/DC converter 130.

Auxiliary machinery 120 such as vehicle auxiliary machinery and FC auxiliary machinery are connected between the battery 60 and the DC/DC converter 130. The battery 60 serves as a power source for the auxiliary machinery 120. Incidentally, the vehicle auxiliary machinery includes various types of power equipment (including lighting equipment, air-conditioning equipment, and oil hydraulic pumps) used, for example, when driving the vehicle; and the FC auxiliary machinery includes various types of power equipment (including pumps for supplying the fuel gas and the oxidant gas) used to operate the fuel cell 40.

A cell voltage sensor 75 detects a voltage (cell voltage) of each cell constituting the fuel cell 40 under the control of the control unit 80. Specifically speaking, the cell voltage sensor 75 detects the voltage of each cell constituting the fuel cell 40 at the time of, for example, termination of the system and then outputs the detected result to the control unit 80.

The control unit 80 is constituted from, for example, CPU, ROM, and RAM and serves as the center of the system and controls the respective parts of the system in accordance with each sensor signal input from the voltage sensor 140, the current sensor 150, a temperature sensor 50 for detecting the temperature (FC temperature) of the fuel cell 40, an SOC sensor for detecting the state-of-charge (SOC) of the battery 60, and an accelerator pedal.

The control unit 80 also detects the cell voltage when terminating the operation of the system. Specifically speaking, the control unit (diagnosis means) 80 judges, based on each cell voltage detected by the cell voltage sensor (component relating to the fuel cell) 75, whether the system is in a normal operating state or an abnormal operating state (hereinafter referred to as the "cell monitor diagnosis"), and then stores the result of the diagnosis in a nonvolatile memory (storage means) 85. Incidentally, an example of the nonvolatile memory 85 includes an FRAM (Ferroelectric Random Access Memory); however, the nonvolatile memory 85 is not limited to this example, and various types of memory can be used.

When activating the system, the control unit 80 first accesses the nonvolatile memory 85 and checks if the diagnosis result indicating a normal operating state is stored in the nonvolatile memory 85 or not. If the control unit 80 determines that the diagnosis result indicating the normal operating state is stored, it then judges, based on the FC temperature detected by, for example, the temperature sensor 50, whether or not the low-temperature countermeasure processing is necessary at the time of activation of the system.

Figure 2:
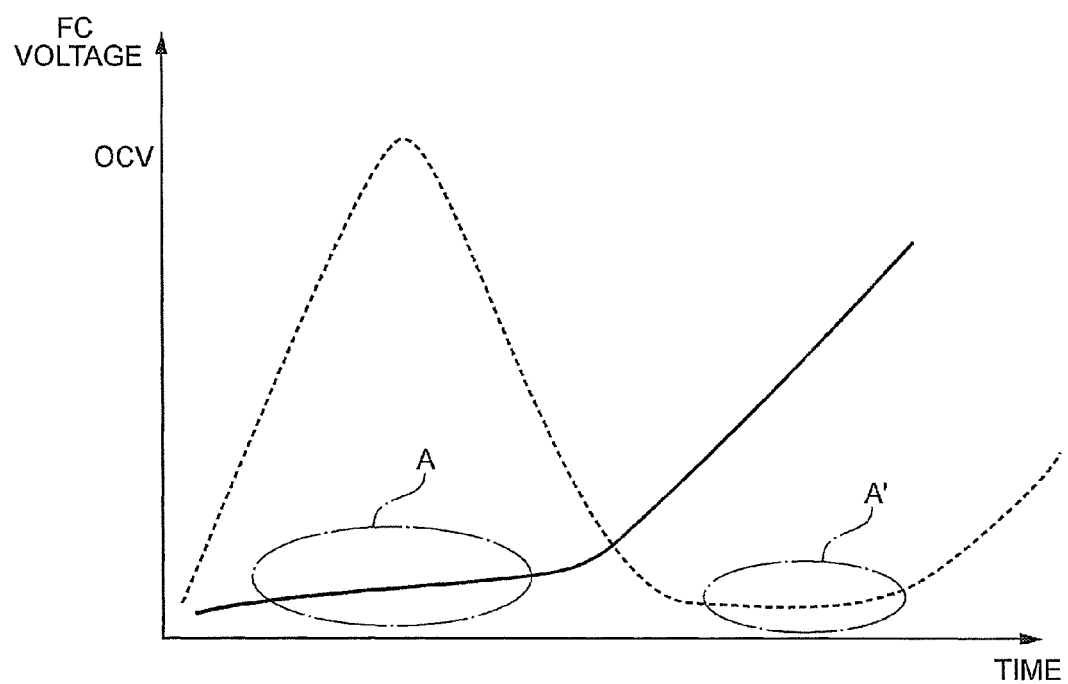
FIG. 2 shows changes in an FC voltage at the time of activation.

FIG. 2 is a diagram showing changes in the FC voltage at the time of activation; and a solid line represents changes in the FC voltage when the low-temperature countermeasure processing is executed without generating the OCV, and a dotted line represents changes in the FC voltage when the low-temperature countermeasure processing is executed after generating the OCV.

If the control unit 80 determines that the low-temperature countermeasure processing is necessary, it controls the output voltage of the fuel cell 40 to be a target voltage for the low-temperature countermeasure processing without having the fuel cell 40 enter the OCV state, thereby executing the low-temperature countermeasure processing (see area A in FIG. 2, which will be explained later in detail). In this way, it is possible to reduce the time spent before actually activating the system by judging whether the low-temperature countermeasure processing is necessary or not, before the fuel cell 40 enters the OCV state.

However, if the control unit 80 determines that the diagnosis result indicating the normal operating state is not stored (for example, when the past result of diagnosis is deleted by vehicle inspection or the like), it is impossible to judge whether the system is in normal operating state or not. In this case, it is necessary to make the fuel cell 40 enter the OCV state once in order to conduct the cell monitor diagnosis to check whether the system is in a normal operating state or not. Therefore, after making the fuel cell 40 enter the OCV state once, the control unit 80 conducts the cell monitor diagnosis using the fuel cell 40. Once the control unit 80 obtains the result of the diagnosis of the normal operating state, it judges whether the low-temperature countermeasure processing is necessary or not as described above; and if it is determined that the low-temperature countermeasure processing is necessary, the control unit 80 executes the low-temperature countermeasure processing (see area A in FIG. 2, which will be explained later in detail).

Low-temperature Countermeasure Processing

Figures 3A, 3B:
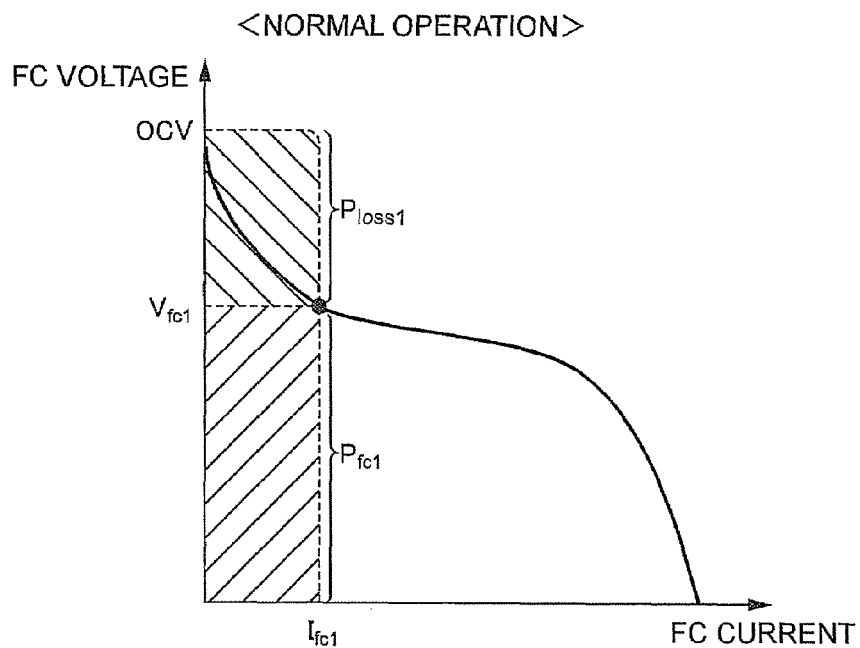
FIG. 3A shows the operational status of a fuel cell when low-temperature countermeasure processing is not performed.
FIG. 3B shows the operational status of the fuel cell when the low-temperature countermeasure processing is performed.

FIG. 3A is a diagram for explaining the operation (normal operation) of the fuel cell when the low-temperature countermeasure processing is not executed; and FIG. 3B is a diagram for explaining the operation (low-efficiency operation) of the fuel cell when the low-temperature countermeasure processing is executed. Incidentally, the horizontal axis represents the FC current and the vertical axis represents the FC voltage in FIG. 3A and FIG. 3B.

Generally, the fuel cell 40 that exhibits a current-voltage characteristic (hereinafter referred to as "I-V curve") as shown in FIG. 3 is operated at a normal operating point (Ifc1, Vfc1) where power loss is small relative to output power (see FIG. 3A).

On the other hand, when the low-temperature countermeasure processing is executed, the fuel cell 40 is operated at a low-efficiency operating point (Ifc2, Vfc2) with a large power loss, so that the internal temperature of the fuel cell 40 will be increased (see FIG. 3B). Since the amount of power loss (i.e., the amount of heat loss) from the energy that can be taken out from the reaction between hydrogen and oxygen is increased actively during the process of the low-efficiency operation, it is possible to warm up the system quickly.

When executing the low-temperature countermeasure processing according to this embodiment, the fuel cell 40 is shifted to the target operating point (Ifc2, Vfc2) for the low-temperature countermeasure processing without making the fuel cell 40 enter the OCV state as indicated with β in FIG. 3B, but not as indicated with a in FIG. 3B where the fuel cell 40 is shifted to the target operating point (Ifc2, Vfc2) for the low-temperature countermeasure processing after making the fuel cell 40 enter the OCV state. As a result, it is possible to reduce time spent before actually activating the system. The operation of the fuel cell system 100 at the time of activation according to this embodiment will be explained below.

(2) Operation According to Embodiment

Figure 4:
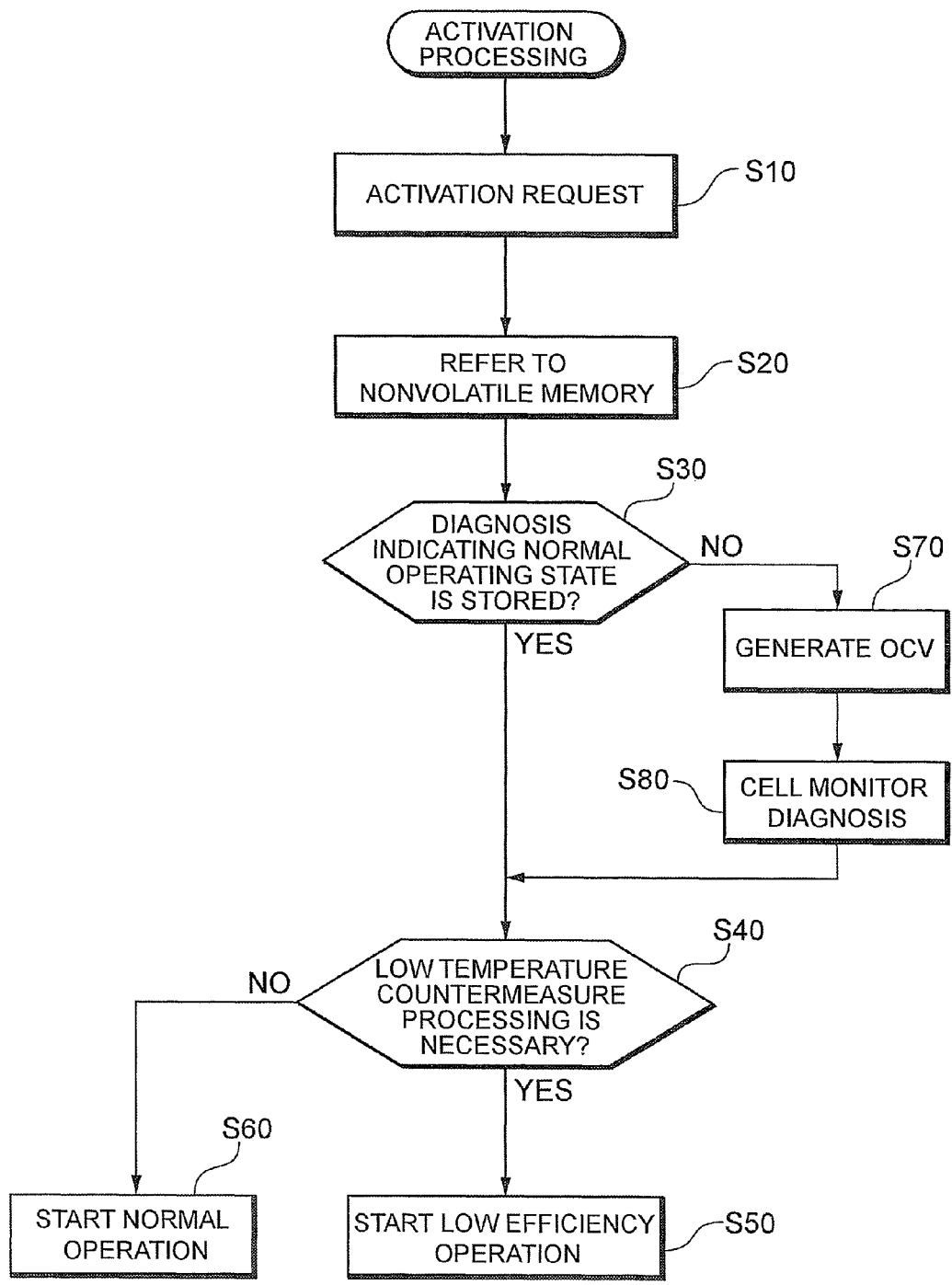
FIG. 4 is a flowchart illustrating activation processing.

FIG. 4 is a flowchart illustrating activation processing executed by the control unit After detecting that a request for activation of the system has been input (step S10), the control unit 80 refers to the nonvolatile memory 85 (step S20) and checks if the diagnosis result indicating the normal operating state is stored in the nonvolatile memory 85 or not (step S30).

If the control unit (judgment means) 80 determines that the diagnosis result indicating the normal operating state is stored (step S30; YES), it refers to, for example, the FC temperature detected by the temperature sensor 50 and the like and judges whether or not the low-temperature countermeasure processing is necessary at the time of activation (step S40). For example, if the FC temperature detected by the temperature sensor 50 is lower than a set threshold temperature, the control unit 80 determines that the low-temperature countermeasure processing is necessary. As a matter of course, the judgment method is not limited to the above-described example; and when, for example, the outside air temperature or a temperature of other system components is detected instead of the FC temperature, and the outside air temperature is lower than the threshold temperature, the control unit 80 may determine that the low-temperature countermeasure processing is necessary.

If the control unit (control means) 80 determines that the low-temperature countermeasure processing is necessary (step S40; YES), it controls the output voltage of the fuel cell 40 to be a target voltage for the low-temperature countermeasure processing without having the fuel cell 40 enter the OCV state, thereby executing the low-temperature countermeasure processing (see the solid line in FIG. 2).

Specifically speaking, the control unit 80 first calculates the target operating point (Ifc2, Vfc2) for the low-temperature countermeasure processing as shown in FIG. 3B based on a difference between the target FC temperature and the currently detected FC temperature. After the calculation, the control unit 80 controls the DC/DC converter 130 to shift the operating point of the fuel cell 40 to the target operating point (Ifc2, Vfc2), thereby starting low-efficiency operation (step S50). Specifically speaking, the control unit 80 follows the route indicated with β in FIG. 3B to shift the fuel cell 40 to the target operating point (Ifc2, Vfc2) for the low-temperature countermeasure processing without having the fuel cell 40 enter the OCV state, and then starts the low-efficiency operation. In this way, it is possible to reduce time spent before actually activating the system by shifting the fuel cell 40 to the target operating point (Ifc2, Vfc2) for the low-temperature countermeasure without having the fuel cell 40 enter the OCV state.

On the other hand, if the control unit 80 determines that the low-temperature countermeasure processing is not necessary (step S40; NO), it shifts the fuel cell 40 to the normal operating point (Ifc1, Vfc1) (see FIG. 3A) and then starts normal operation (step S60).

Furthermore, if the control unit 80 determines that the diagnosis result indicating the normal operating state is not stored in the nonvolatile memory 85 (step S30; NO), it makes the fuel cell 40 enter the OCV state once (step S70). The OCV is generated before activation in this way in order to conduct the cell monitor diagnosis. It is necessary to confirm that the system is in normal operating state when activating the system as described above. If the diagnosis result indicating the normal operating state is not stored in the nonvolatile memory 85, it is impossible to judge whether the system is in a normal operating state or not. In this case, after having the fuel cell 40 enter the OCV state once (see the dotted line in FIG. 2), the cell monitor diagnosis is performed using the fuel cell 40 (step S80).

If the control unit 80 obtains the diagnosis result indicating the normal operating state, it proceeds to step S40 and judges whether the low-temperature countermeasure processing is necessary or not. If the control unit 80 determines that the low-temperature countermeasure processing is necessary, it shifts the fuel cell 40 to the target operating point (Ifc2, Vfc2) for the low-temperature countermeasure processing and then starts the low-efficiency operation. However, since the fuel cell 40 is made to enter the OCV state before activation in this case, the control unit 80 follows the route indicated with a in FIG. 3B, shifts the fuel cell 40 to the target operating point (Ifc2, Vfc2) for the low-temperature countermeasure processing and then starts the low-efficiency operation (step S40→step S50). On the other hand, if the control unit 80 determines that the low-temperature countermeasure processing is not necessary, it shifts the fuel cell 40 to the normal operating point (Ifc1, Vfc1) (see FIG. 3A) and then starts the normal operation in the same manner as described above (step S40→step S60).

When performing the low-temperature countermeasure processing at the time of activation of the system according to this embodiment as described above, whether the low-temperature countermeasure processing is necessary or not is judged before the fuel cell is made to enter the OCV state. If it is determined as a result of the above judgment that the low-temperature countermeasure processing is necessary, the time spent before actually activating the system can be reduced by shifting the fuel cell to the target operating point for the low-temperature countermeasure without having the fuel cell enter the OCV state.

Incidentally, in the above-described embodiment, the fuel cell 40 is shifted to the target operating point for the low-temperature countermeasure without having the fuel cell 40 enter the OCV state when the result of the diagnosis of the normal operating state is stored in the nonvolatile memory 85 and it is determined that the low-temperature countermeasure processing is necessary. However, irrespective of whether the result of the diagnosis exists or not, as long as it can be confirmed by some means that there is no abnormality in the system, and it is determined that the low-temperature countermeasure processing is necessary, the fuel cell 40 may be shifted to the target operating point for the low-temperature countermeasure without having the fuel cell 40 enter the OCV state.

The invention claimed is:

1. A fuel cell system capable of executing low-temperature countermeasure processing, wherein the fuel cell system comprises:
   a judgment device that judges the need for the low-temperature countermeasure processing before occurrence of an open circuit voltage in a fuel cell when activating the fuel cell system; and
   a control device that sets operating the fuel cell as low-efficiency operation at a target operation point for low-temperature countermeasure processing which has a power loss larger than that of a usual operation point, in case where it is judged by the judgment device that low-temperature countermeasure processing is needed,
   wherein the control device shifts the operation point to the target operation without making the fuel cell generate the OCV (Open Circuit Voltage), and then starts the low-efficiency operation.

2. The fuel cell system according to claim 1, wherein the fuel cell system further comprises:
   a diagnosis device that diagnoses whether the system is normal or not; and
   a storage device that stores a diagnosis result;
   wherein the control device shifts the operation point to the target operation without making the fuel cell generate the OCV (Open Circuit Voltage), and then starts the low efficiency operation, in case where the diagnosis result at the time of termination of the system, which is stored in the storage device, is normal.

3. The fuel cell system according to claim 2, wherein the diagnosis device diagnoses whether the system is normal or not by detecting a cell voltage of the fuel cell.

* * * * *

UNITED STATES PATENT AND TRADEMARK OFFICE
CERTIFICATE OF CORRECTION

PATENT NO. : 8,182,953 B2
APPLICATION NO. : 12/522427
DATED : May 22, 2012
INVENTOR(S) : Kota Manabe It is certified that error appears in the above-identified patent and that said Letters Patent is hereby corrected as shown below:

In the Specifications:

| Column | Line | |
|---|---|---|
| 4 | 63 | Change "(see area A in Fig. 2," to --(see area A' in Fig. 2,--. |
| 5 | 26 | Change "with a in FIG. 3B" to --with α in FIG. 3B--. |
| 5 | 35 | After "control unit" insert --80--. |
| 6 | 44 | Change "indicated with a" to --indicated with α--. |

Signed and Sealed this
Sixteenth Day of April, 2013

Teresa Stanek Rea
*Acting Director of the United States Patent and Trademark Office*